United States Patent [19]
Mueller et al.

[11] Patent Number: 6,158,693
[45] Date of Patent: Dec. 12, 2000

[54] RECOVERABLE BOOSTER STAGE AND RECOVERY METHOD

[75] Inventors: George E. Mueller, Kirkland, Wash.; Henry O. Pohl, Seabrook, Tex.

[73] Assignee: Kistler Aerospace Corporation, Kirkland, Wash.

[21] Appl. No.: 09/030,724

[22] Filed: Feb. 25, 1998

[51] Int. Cl.[7] .................................................. B64G 1/00
[52] U.S. Cl. ......................... 244/158 R; 244/172; 244/2
[58] Field of Search .............................. 244/158 R, 172, 244/160, 2

[56] References Cited

U.S. PATENT DOCUMENTS

| | | | |
|---|---|---|---|
| 3,065,596 | 11/1962 | Schultz | 60/35.3 |
| 3,065,597 | 11/1962 | Adamson et al. | 60/35.3 |

(List continued on next page.)

FOREIGN PATENT DOCUMENTS 9013481  11/1990  WIPO .

OTHER PUBLICATIONS

Gary C. Hudson, "Phoenix: A Commercial, Reusable Single–Stage Launch Vehicle," *Pacific American Launch Systems, Inc.*, date unknown, pp. 1–13.

Dr. William A. Gaubatz, "Space is a Place," *McDonnell Douglas Aerospace*, date unknown, pp. 1–13.

D.E. Koelle, et al., "The Single–Stage Reusable Ballistic Launcher Concept for Economic Cargo Transportation," *37th Congress of the International Astronautical Federation*, Oct., 1986, 7 pages.

Maxwell W. Hunter, "Draft II The SSX Spaceship, Experimental,"source unknown, Mar. 15, 1998, updated Mar. 11, 1989, pp. 1–32.

Rudi Beichel, et al., "IAF–88–229 The Next Generation Rocket Engines," *39th Congress of the International Astronautical Federation*, Oct., 1988, 7 pages.

Robert L. Staehle, et al., "Crew Transportation for the 1990s: Commercializing Manned Flight with Today's Propulsion,"*World Space Foundation*, 1989, 19 pages.

A. P. Bruckner, et al., "IAF 92–0859 Antares: A Low Cost Modular Launch Vehicle Concept," *43rd Congress of the International Astronautical Federation*, Aug./Sep., 1992, pp. 1–13.

D. E. Koelle, "IAA 92–0164 Cost Analysis of Singel–Stage (SSTO) Reusable Ballistic Launch Vehicles," *43rd Congress of the International Astronautical Federation*, Aug./Sep., 1992, pp. 1–7.

(List continued on next page.)

*Primary Examiner*—J. Woodrow Eldred
*Attorney, Agent, or Firm*—Baker Botts L.L.P.

[57] ABSTRACT

A recoverable/reusable booster stage has a restartable center liquid-fueled rocket engine mounted in the aft portion of a vehicle body in alignment with the center axis of the body. The booster stage may also include two side liquid-fueled rocket engines mounted in the aft portion of the body in symmetrical relation to the center rocket engine. After booster stage separation, the center engine is restarted to direct the booster stage towards a recovery site.

23 Claims, 6 Drawing Sheets

U.S. PATENT DOCUMENTS

| | | | |
|---|---|---|---|
| 3,065,598 | 11/1962 | Schultz | 60/35.3 |
| 3,168,266 | 2/1965 | Yost | 244/138 |
| 3,173,252 | 3/1965 | Ziegenhagen | 60/35.6 |
| 3,246,467 | 4/1966 | Rossetto | 60/35.6 |
| 3,248,875 | 5/1966 | Wolcott | 60/35.6 |
| 3,254,486 | 6/1966 | Kenny | 60/35.6 |
| 3,254,603 | 6/1966 | Gould | 102/70 |
| 3,262,655 | 7/1966 | Gillespie, Jr. | 244/1 |
| 3,266,237 | 8/1966 | Crowell, Jr. et al. | 60/35.3 |
| 3,286,629 | 11/1966 | Laue | 102/19 |
| 3,293,855 | 12/1966 | Cuttill et al. | 60/229 |
| 3,300,981 | 1/1967 | Webb | 60/259 |
| 3,302,400 | 2/1967 | Mangum | 60/39.82 |
| 3,534,686 | 10/1970 | Watson | 102/49.5 |
| 3,541,796 | 11/1970 | Morris | 60/256 |
| 3,597,923 | 8/1971 | Simon | 60/260 |
| 3,603,093 | 9/1971 | Isley et al. | 60/260 |
| 3,702,683 | 11/1972 | Foust | 244/153 |
| 3,732,693 | 5/1973 | Chu | 60/207 |
| 3,815,359 | 6/1974 | Thurston | 60/254 |
| 3,828,551 | 8/1974 | Schmidt | 60/204 |
| 3,882,676 | 5/1975 | Schmidt | 60/245 |
| 3,910,037 | 10/1975 | Salkeld | 60/250 |
| 3,943,706 | 3/1976 | Grafwallner et al. | 60/204 |
| 4,163,534 | 8/1979 | Seeger | 244/3.22 |
| 4,265,416 | 5/1981 | Jackson et al. | 244/2 |
| 4,357,795 | 11/1982 | Bastian et al. | 60/204 |
| 4,796,839 | 1/1989 | Davis | 244/158 R |
| 4,802,639 | 2/1989 | Hardy et al. | 244/2 |
| 4,834,324 | 5/1989 | Criswell | 244/160 |
| 4,844,380 | 7/1989 | Peoples et al. | 244/3.22 |
| 4,884,770 | 12/1989 | Martin | 244/158 R |
| 4,912,925 | 4/1990 | Foust | 60/259 |
| 5,031,857 | 7/1991 | MacConochie et al. | 244/3.28 |
| 5,058,833 | 10/1991 | Carmouche | 244/158 R |
| 5,090,642 | 2/1992 | Salkeld | 244/158 R |
| 5,119,627 | 6/1992 | Bradford et al. | 60/251 |
| 5,133,183 | 7/1992 | Asaoka et al. | 60/204 |
| 5,141,181 | 8/1992 | Leonard | 244/172 |
| 5,143,327 | 9/1992 | Martin | 244/158 R |
| 5,158,248 | 10/1992 | Mockovciak, Jr. | 244/160 |
| 5,217,188 | 6/1993 | Thole et al. | 244/172 |
| 5,295,642 | 3/1994 | Palmer | 244/2 |
| 5,404,714 | 4/1995 | Vuillamy et al. | 60/257 |
| 5,456,424 | 10/1995 | Palmer | 244/2 |
| 5,531,067 | 7/1996 | Koppel | 60/259 |
| 5,564,648 | 10/1996 | Palmer | 244/2 |
| 5,568,901 | 10/1996 | Steinnon | 244/63 |
| 5,626,310 | 5/1997 | Kelly | 244/2 |
| 5,661,970 | 9/1997 | Müller et al. | 60/233 |
| 5,667,167 | 9/1997 | Kistler | 244/110 E |
| 5,689,949 | 11/1997 | DeFreitas et al. | 60/39.96 |

OTHER PUBLICATIONS

H. O. Ruppe, "Design Considerations For Future Space Launchers," *Acta Astraunautica*(?), vol. 29, No. 9, (printed in Great Britian), 1993, pp. 705–722, Pergamon Press Ltd.

Col. Simon P. Worden, et al., "Single stage rocket technology: Here today," *Aerospace America*, Jul., 1993, 8 pages.

Ray R. Smiljanic, et al., "Delta Clipper: Design for supportability," *Aerospace America*, Jul. 1993, pp. 24–27.

Scott W. Benson, et al., "Titan III Feasibility for HL–20 Prototype Missions," *Journal of Spacecraft and Rockets*, Sep./Oct., 1993, pp. 615–621.

Mark K. Sellards, "The DC–X makes its first test hops A rocketship has landed on Earth!," *Countdown*, Oct., 1993, pp. 10–11.

Michael A. Dornheim, "DC–X Proving Initial Operational Concepts," *Aviation Week & Space Technology*, Oct. 11, 1993, 3 pages.

Ivan Beckey, "Why SSTO Rocket Launch Vehicles Are Now Feasible And Practical," *NASA Headquarters*, Nov. 21, 1993, pp. 1–21.

Arnold D. Aldrich, "NASA's Access To Space Study," *NASA Headquarters*, Nov. 21, 1993, pp. 12.

Alan W. Whilhite, et al., "Technology and Staging Effects on Two–Stage–to–Orbit Systems," *Journal of Spacecraft and Rockets*, Jan./Feb., 1994, pp. 31–38.

Steven J. Isakowitz, "International Reference Guide to Space Launch Systems," American Institute of Aeronautics and Astronautics, 1991, 295 pages.

RECOVERABLE BOOSTER STAGE AND RECOVERY METHOD

TECHNICAL FIELD OF THE INVENTION

The present invention relates to launch vehicles and, in particular, to recoverable booster stages that are used to assist orbital vehicles in attaining orbit or heading to outer space and to a method of recovering a booster stage for reuse.

BACKGROUND OF THE INVENTION

Multi-stage launch vehicles are widely used to carry payloads into orbit and propel space vehicles into outer space. One or more booster stages accelerate an orbital stage vehicle towards space. The orbital stage vehicle carries the payload into orbit and, in some cases, beyond for travel in outer space. After each booster stage has served its purpose in attaining a certain velocity, it is separated from the next stage (which may be another booster stage or the orbital or space vehicle) and is allowed to fall back to earth, almost always into an ocean. In these existing launch vehicles, recovery of the booster stage is impractical, if not impossible.

The increasing use of orbiting communications satellites, the planned construction of manned space stations, the supplying of the existing space station, and other space activities has already required, and will in the future require, very large investments in launch vehicles that are used only once. Although the fleet of NASA space shuttles are primarily reusable, the costs of producing and operating manned recoverable/reusable vehicles such as the space shuttle is prohibitive.

SUMMARY OF THE INVENTION

An object of the present invention is to reduce the costs of placing vehicles or payloads in earth orbits and in space and, in particular, to provide a recoverable/reusable booster stage for a launch vehicle. Another object is to enable a booster stage to be recovered at any desired site, including near a ground launch site. Yet another object is to enable a booster stage to land in a reusable condition near the launch site, thereby eliminating the need to transport the recovered vehicle over a long distance and permitting a quick turn-around time for another launch.

The foregoing objects are attained, in accordance with the present invention, by a recoverable/reusable booster stage having a restartable, liquid-fueled center rocket engine mounted in the aft portion of a structural/aerodynamic body in alignment with the center axis of the body. In a particular embodiment, the booster stage includes two or more additional side rocket engines mounted in the aft portion of the body in symmetrical relation to the center rocket engine, so that the thrust axes of the side engines generally lie in a plane that includes the center axis of the body. In one embodiment, two side rocket engines may be placed in a line with the restartable center engine. In another embodiment, four side rocket engines may be placed in an "X" configuration with the restartable engine in the center. The invention may use any number of side engines that are integral to the main structural/aerodynamic body or provided as separate strap-ons.

Although it is possible to provide attitude control thrusters to aid in steering the booster stage for recovery, the direction of thrust of the center engine may be controllable so that the vehicle is steerable by the center engine. The side engines are liquid-fueled engines to minimize the costs for reuse, but may also be solid fuel rocket engines.

An important aspect of one embodiment of the present invention is that the three engines (two side engines and one center engine) are aligned along an axis that is transverse to the center axis of the vehicle body and that the center engine lies on the center axis of the body. This arrangement allows the three engines to propel the launch vehicle from launch to a separation point with the combined thrust of the three engines acting on or near the center of gravity of the launch vehicle during ascent. After booster stage engine shut-down, stage separation, and restarting of the center engine, the center engine thrust also acts on or near the center of gravity of the booster stage during descent.

Advantageously, the side engines are mounted at a cant (e.g., six degrees) such that at lift-off their thrust axis intersects the center of gravity of the launch vehicle. This arrangement, together with positioning the center engine for thrust along the center axis of the vehicle, avoids complicated dynamics from the thrust of all engines, and thereby facilitates control of the ascent trajectory. The center engine and side engines may be mounted in single or multiple axis gimbals to control the launch vehicle.

The center engine and the side engines may be mounted on one or more transverse beams. A three engine in a line configuration may have a single transverse beam, whereas a five engine "X" configuration may have two perpendicular transverse beams. The body, typically, has a tubular structural/aerodynamic circular cylindrical wall and a thrust ring attached to an aft portion of the wall. The thrust beam is connected to the thrust ring by a plurality of compression struts oriented obliquely to the center axis. For example, the compression struts may include side struts connected between portions of the beam proximate to the ends of the beam and the thrust ring and center struts connected between a center portion of the beam and the thrust ring.

The engines can be started at lift-off using compressed oxygen-enriched air from a pad-based starting system. Restarting the center engine in flight for propulsion of the booster stage upon descent is accomplished with a start cartridge. Start cartridges may also be used at launch on all engines of the booster stage, in which case, the center engine has two start cartridges, one for launch and the other for restarting after separation of the recoverable booster stage.

A particular embodiment of the present invention includes a restartable center liquid-fueled rocket engine mounted in the aft portion of the body in alignment with the center axis of the body, the center engine being mounted for selective adjustment of the thrust axis so that the booster stage is steerable, and two side liquid-fueled rocket engines mounted in fixed positions in symmetrical relation to the center rocket engine so that the thrust axes of the side engines define a plane that includes the center axis of the body. Each side engine is oriented such that its thrust axis at lift-off approximately intersects the center of gravity of the launch vehicle. The center engine and the side engines are mounted on a transverse beam, which is connected by several compression struts to a thrust ring attached to an aft portion of the wall, the struts being oriented obliquely to the center axis. The compression struts include side struts connected between portions of the beam proximate to the ends of the beam and the thrust ring and center struts connected between a center portion of the beam and the thrust ring. The center engine has two start cartridges, one for launch and the other for restarting for descent.

There is also provided, in accordance with the present invention, a method of launching a payload into space that uses a multi-stage launch vehicle that includes an orbital or space vehicle and a recoverable/reusable booster stage. The booster stage includes a restartable and steerable liquid-fueled center rocket engine mounted in an aft portion of a body in alignment with a center axis of the body and at least two side liquid-fueled rocket engines in the aft portion of the body in symmetrical relation to the center rocket engine. The launch vehicle ascends from a ground launch site using three or more engines and attains a predetermined velocity for stage separation, at which point the engines of the booster stage are shut down. The orbital vehicle then separates from the booster stage. Next, the center engine of the booster stage restarts and the booster stage flies along a predetermined path toward a recovery site, most preferably a ground site, by controlling the thrust direction of the center engine.

The recovery site may be virtually anywhere within a reasonable distance of the launch site. Ground transport vehicles, helicopters, or other vehicles can be used to bring the booster stage back to the launch site for reuse. One advantage of having a booster stage that is restarted and flown under control after stage separation is the ability to return the booster stage to a ground recovery site near the launch site. For example, the restarted booster stage may be flown back uprange along a flight path that returns it to a location proximate to the launch pad. A margin of error ensures that the booster stage does not land on the launch facility or at other undesirable or populated sites. The booster stage includes deployable parachutes and deployable inflatable landing cushions. At a predetermined point along the return path, the center engine of the booster stage is shut down. After slowing of the vehicle by aerodynamic forces, the parachutes and the landing cushions are deployed, and the booster stage settles to a landing at the recovery site in a reusable condition.

There are various trade-offs to be made in designing the flight path for recovery near the launch site. One involves the rate of climb at ascent. In order to minimize the amount of fuel needed to return to the launch site, the flight path at ascent may be kept steep, so that the vehicle does not have to return from a great distance. The orbital vehicle may then require more thrust, a longer burn time, or both to achieve sufficient orbital velocity.

Other technical advantages are readily apparent to one skilled in the art from the following figures, description, and claims.

BRIEF DESCRIPTION OF THE DRAWINGS

For a more complete understanding of the present invention, and for further features and advantages, reference is now made to the following description, taken in conjunction with the accompanying drawings, in which.

DETAILED DESCRIPTION OF THE INVENTION

Figure 1:
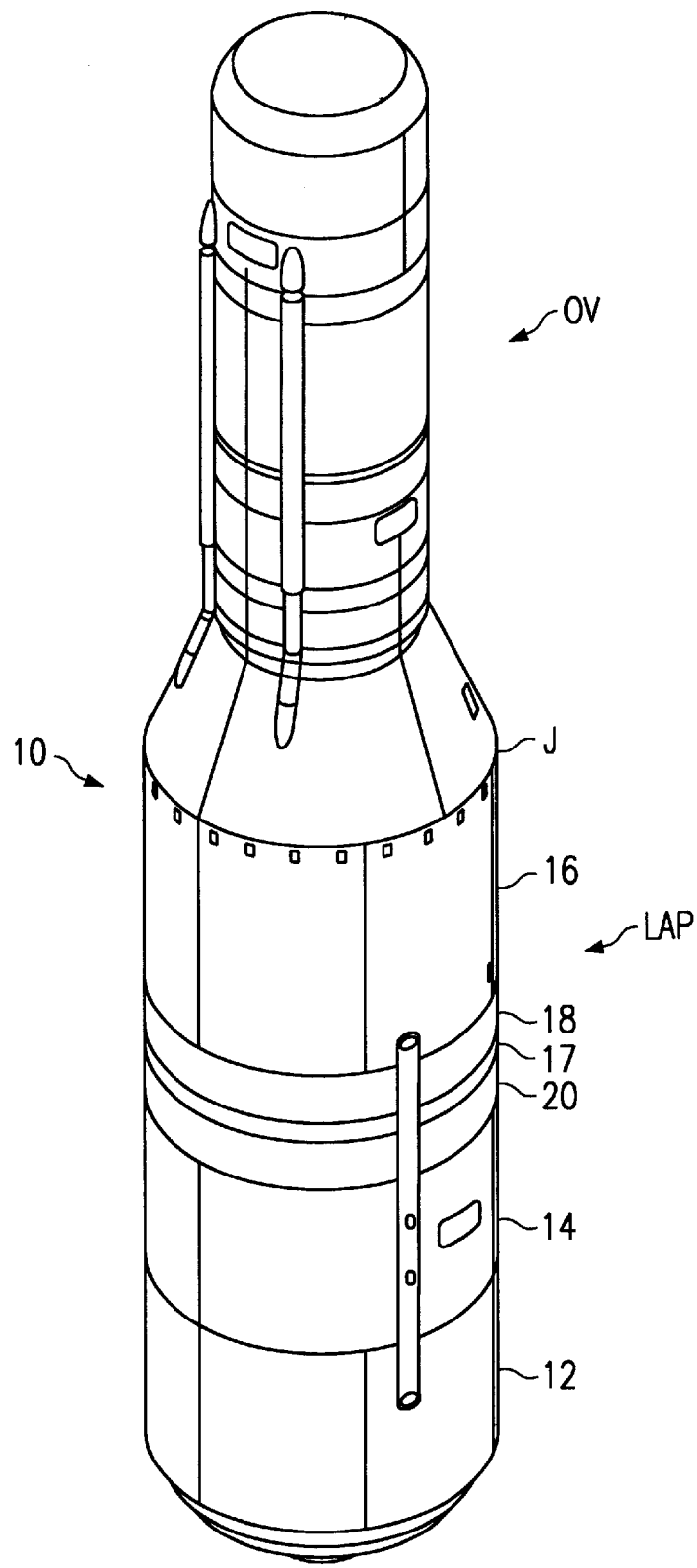
FIG. 1 is a side pictorial view of a launch vehicle that includes a booster stage embodying the present invention, the launch vehicle being viewed from a vantage point slightly above the forward end.

The launch vehicle includes an orbital vehicle (OV) and a booster stage or launch assist platform (LAP), which propels the OV towards an orbit around the earth. The juncture of the LAP with the OV is indicated by the line J. The two-stage combination LAP/OV is designed primarily to take payloads into earth orbit. The LAP can also be used alone or with one or more additional booster stages to assist a space vehicle in reaching outer space. The present invention contemplates the recovery of at least one booster stage following ascent of the launch vehicle.

The LAP has a body that is essentially a tubular structural/aerodynamic shell 10 of circular cylindrical shape, which is constituted in major part by internally ribbed tubular panels 12, 14 and 16 of a composite material (fibers dispersed in a resin binder). The outer peripheral wall 17 of a main aluminum liquid oxygen (LOX) tank is integrated into the wall 10 and is thermally isolated from the panels 14 and 16 by aluminum skirts 18 and 20. Various systems and equipment packages (e.g., for engine control, flight path control, altitude control, communications, and the like) are mounted within the shell.

Figure 2:
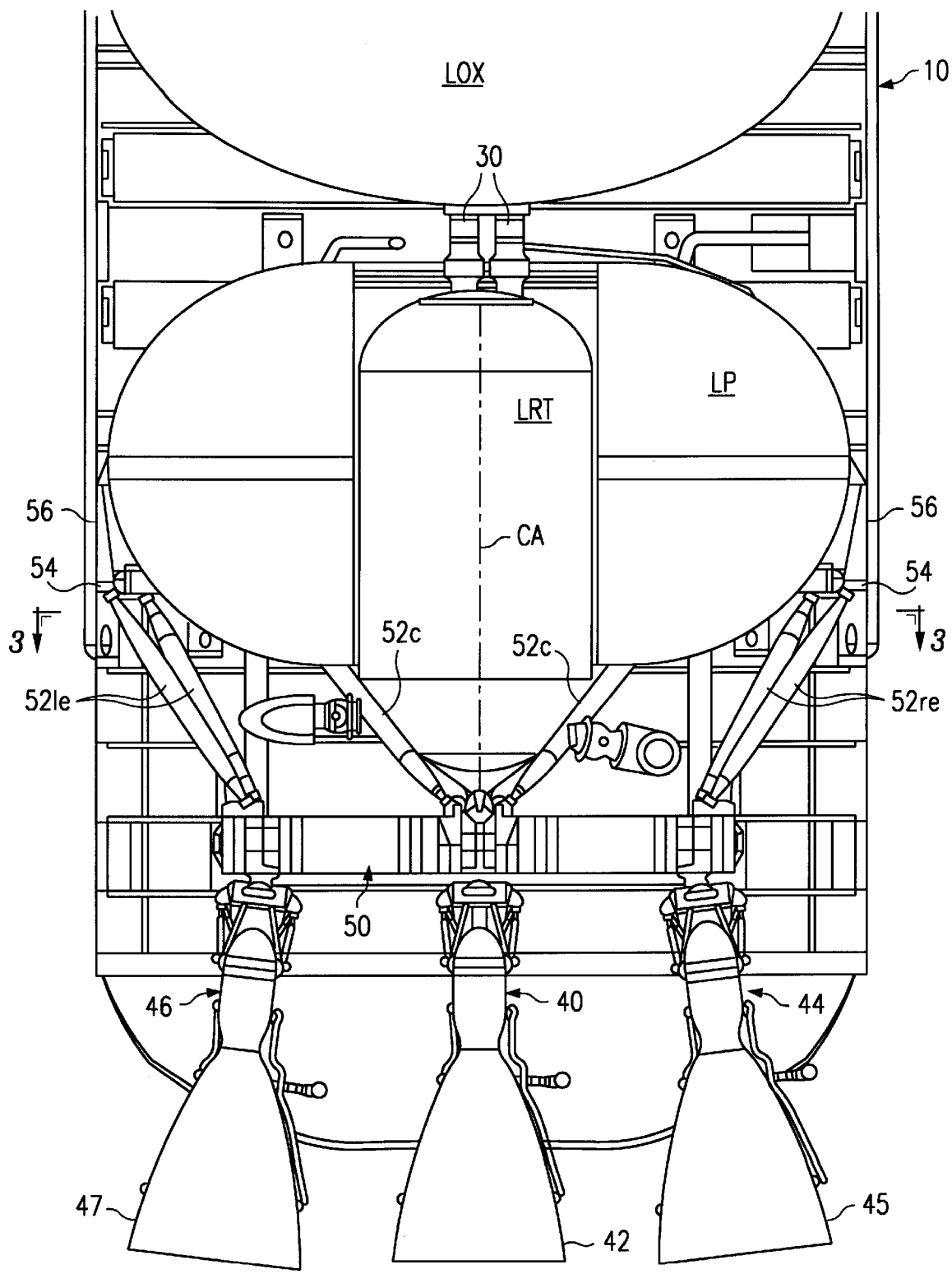
FIG. 2 is a generally schematic cut-away view of the aft portion of the booster stage of FIG. 1.

FIG. 2 illustrates an annular liquid propellant tank (LP) that occupies a region just above the engines. A hole in the center of the tank LP contains an aluminum LOX retention tank (LRT), through which LOX from the main tank (LOX) passes on its way to the engines. The LOX in the main tank LOX is consumed on ascent. At engine shut-down prior to stage separation, valves in the conduits 30 from the main tank LOX to the retention tank LRT are closed to isolate a supply of LOX in the capture tank for consumption by the center engine when it is restarted and run to propel the LAP to its recovery destination. The tanks LOX and LRT are pressurized by pressure tanks (not shown), which deliver pressurized gas to the tanks to supply LOX to the engines.

A center rocket engine 40 mounts adjacent the aft end of the body in alignment with (center of the nozzle 42 centered on) the center axis CA of the vehicle body 10. In a particular embodiment, two side engines 44 and 46 are mounted symmetrically with respect to the center axis CA and centered on axes through the centers of the respective nozzles 45 and 47 that lie in a plane that also includes the center axis of the body. LAP may also include additional side engines mounted within vehicle body 10 or provided as strap-on boosters. For example, LAP may include four side engines arranged in an "X" configuration around center engine 40.

Although side engines 44 and 46 may be mounted on gimbals for adjustments of their orientations to configure the LAP for a particular mission, such as for use with different orbital vehicles, the side engines may be fixed in flight to provide thrust along axes that pass through the center of gravity of the launch vehicle (LAP and OV) at lift-off. The center engine 40 is mounted on gimbals and is controlled in flight to steer the launch vehicle along a desired trajectory on ascent and to steer the LAP after stage separation and restart of the center engine 40 for powered flight to a recovery site.

Figure 3:
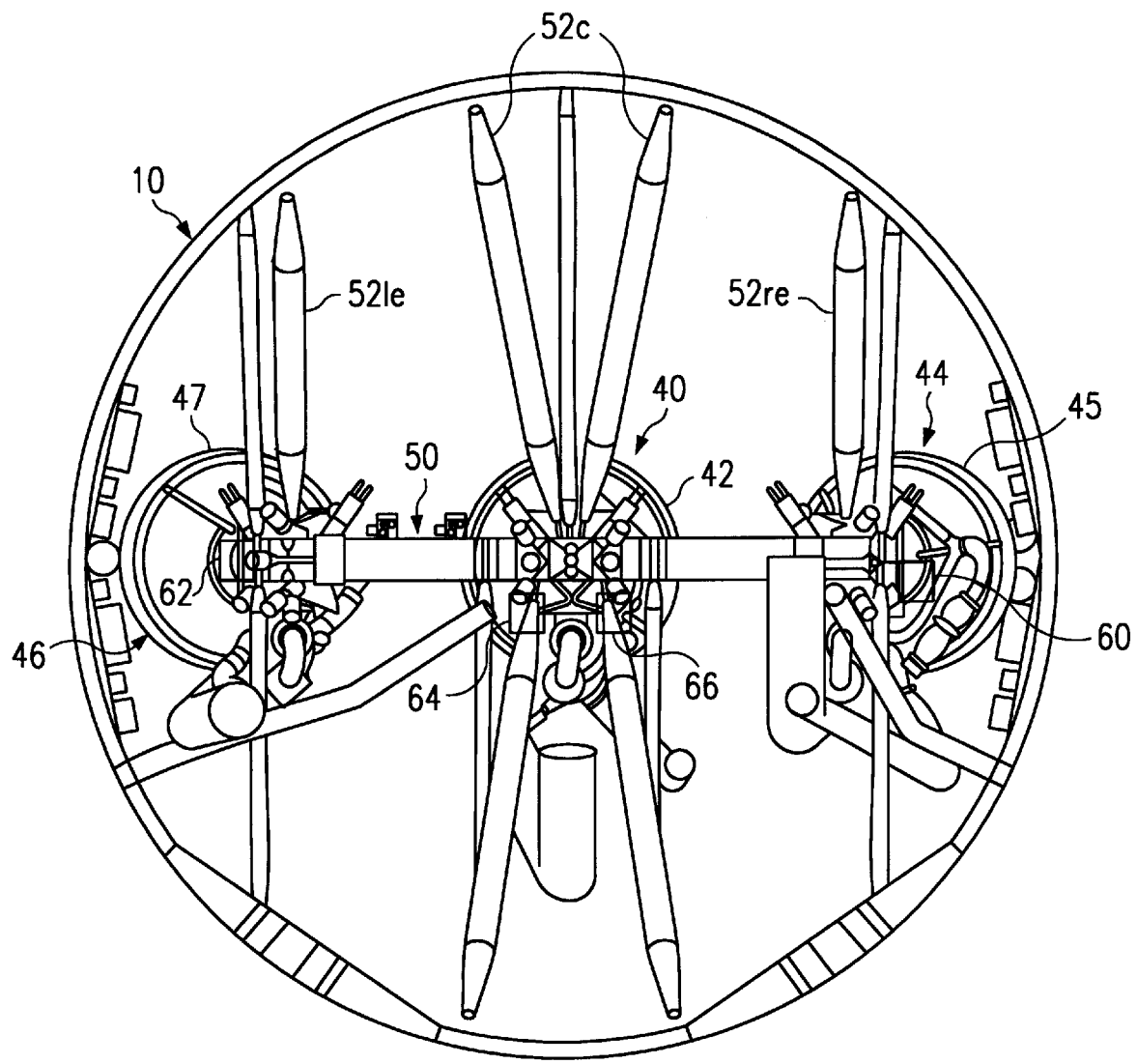
FIG. 3 is a generally schematic view of the aft portion of the booster stage, taken along the lines 3—3 of FIG. 2, with the tanks removed.
Figure 4:
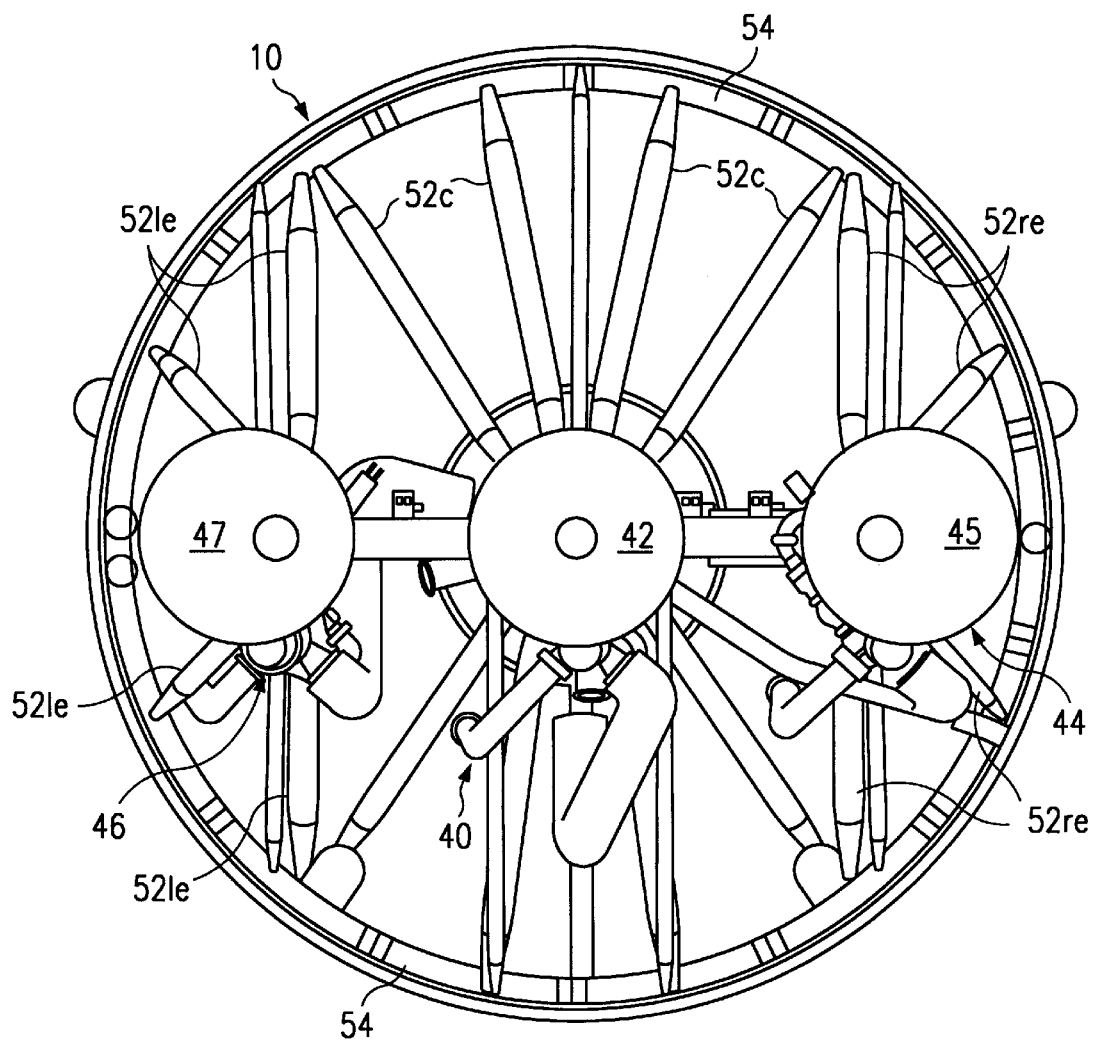
FIG. 4 is a generally schematic end view of the booster stage.
Figure 5:
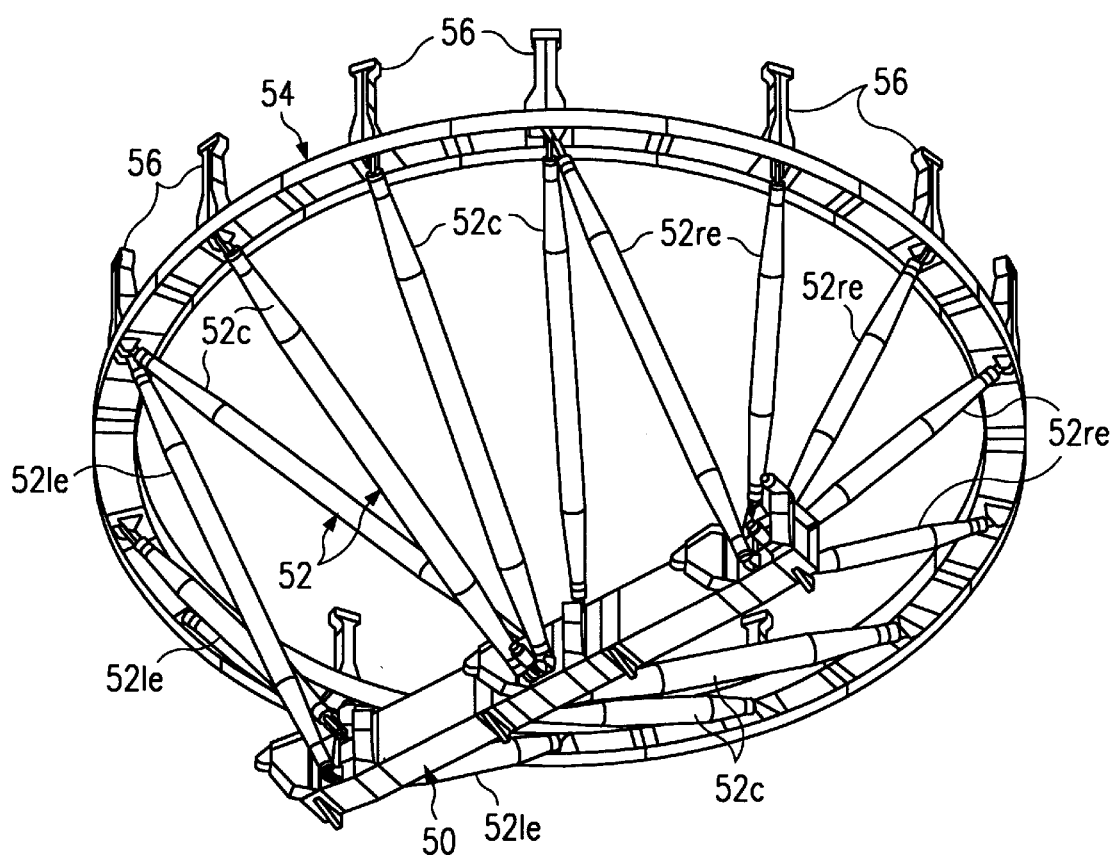
FIG. 5 is a perspective view, looking from a point of view to the side and below, of the structure by which the engines are mounted and connected to the body of the booster stage.

As illustrated in more detail in FIGS. 3, 4, and 5, the engines 40, 44, and 46 are mounted on a common transverse beam 50, which is a weldment of several pieces, each of which is of a manageable size for fabrication and some of which, such as engine mounts, are the same (at least when the three engines are identical). Other embodiments that include additional side engines may include additional transverse beams 50. For example, a five engine "X" configuration may include two perpendicular transverse beams 50. Alternatively, LAP may not include any transverse beams 50, but instead place engines 44 and 46 is side mounted canisters or strap-ons. The present invention contemplates any number, arrangement, and mounting of side engines about a restartable center engine 40, including one embodiment with no side engines.

As can best be seen in FIG. 5 showing a particular embodiment of a three engine configuration, the beam 50 is connected to the LAP shell 10 by a system of compression struts 52, each of which is connected between the beam 50 and a main thrust ring 54. The thrust ring 54 supports the shell 10 of the LAP and directly carries the tank LP by support brackets 56. The compression struts are arranged in groups, the struts 52c of one group being connected to the center portion of the beam 50 and the struts of two other groups 52re and 52le being connected to the respective right and left ends of the beam 50. The compression struts extend obliquely at diverse angles relative to the center axis CA of the shell 10 and are connected to the ring 54 at approximately equally circumferentially spaced-apart points. The beam 50 is strong and stiff and is, therefore, able to carry the large forces exerted by the engines with little deflection. The ring 54 is subject to high tensile forces exerted by the struts 52 and is designed accordingly. The struts transmit the thrust forces of the engines from the beam 50 to the ring. The shell 10 is strong and stiff axially, thus subjecting the ring to a reaction load acting parallel to the center axis and distributed substantially uniformly about the circumference of ring 54.

The launch vehicle is launched from a ground launching facility by starting the engines by means of start cartridges 60 and 62 for the side engines 44 and 46, respectively, and start cartridge #1 64 for center engine 40 (the start cartridges are shown schematically in FIG. 3). Alternatively, the engines may be started for launch using compressed gas or other suitable ground-based equipment.

Figure 6:
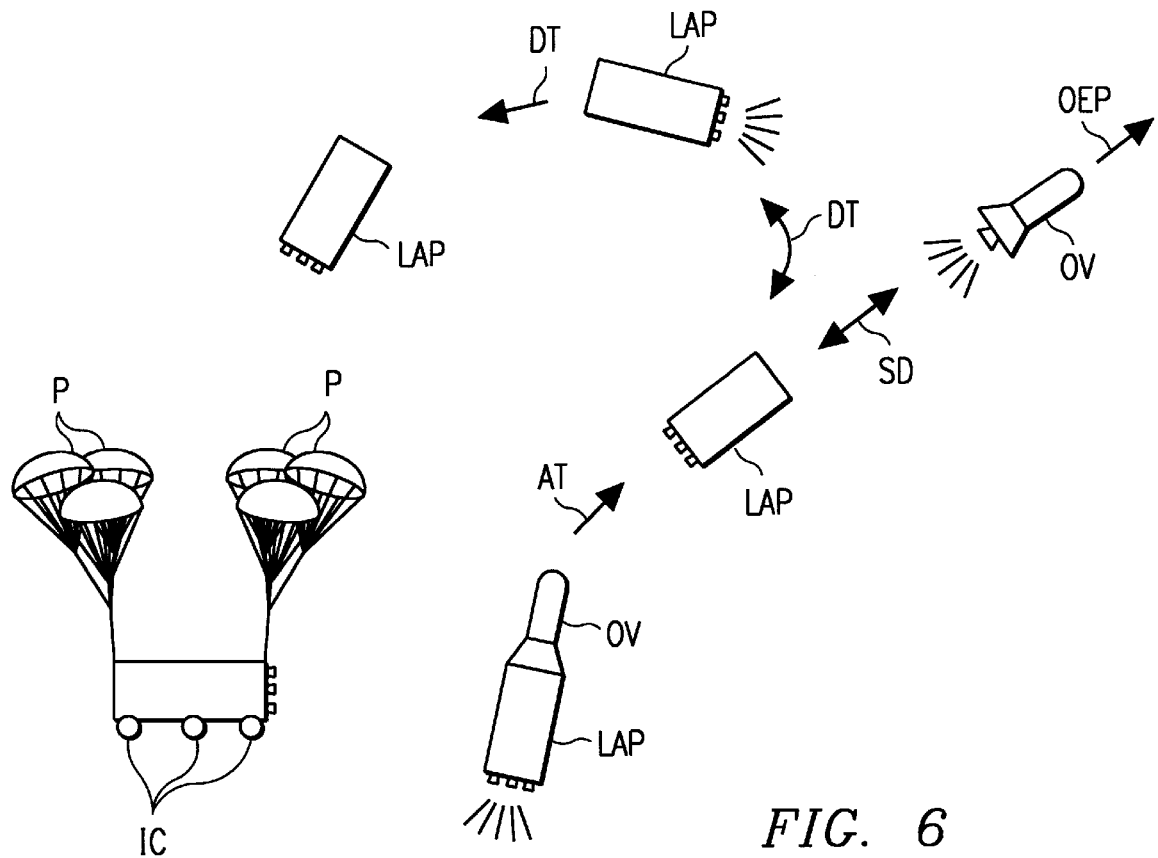
FIG. 6 is a pictorial diagram of the launch, stage separation, and recovery of the booster stage.
Figure 6:
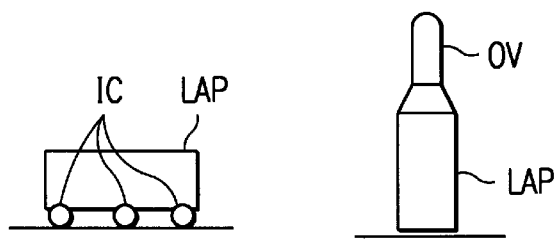

Now referring to FIG. 6, the LAP and OV are flown along a predetermined ascent trajectory AT to a predetermined location for stage separation. The supply valves for liquid propellant and liquid oxygen to the engines are closed, thereby shutting down all engines 40, 44, and 46. The valves in the conduits 30 connecting the main tank LOX to the retention tank LRT are also closed to capture LOX in the retention tank. At this point, the contents of the main tank LOX have been largely used up. Explosive bolts or other suitable mechanism releases the OV from the LAP, and thrusters on the OV are fired to move the OV along a separation distance SD far enough from the LAP to permit a rocket engine on the OV to be safely started, whereupon the OV is accelerated for further ascent along an orbital entry path OEP into orbit.

As soon as the OV is clear of the LAP, the center engine 40 on the LAP is started by opening the valves in the LOX lines from the main tank LOX to the retention tank LRT and from the retention tank to the center engine 40, opening the line from the propellant tank LP to the engine, and firing the start cartridge #2 66 (FIG. 3). Having been considerably lightened by separation of the OV and expenditure of liquid propellant and LOX, the center engine 40 is sufficient to direct the LAP to a suitable recovery site. By controlling the thrust magnitude and direction of the center engine 40, the LAP can be flown along any desired trajectory DT to a recovery site, which can be downrange but is, preferably, uprange and proximate to the launch site. When the LAP reaches a location along the trajectory DT uprange from the recovery site, it is maneuvered by the main engine to an approach path that will take it in a free fall to a location where parachutes P can be deployed. At a suitable position along the approach path, the engine 40 is shut down, and when the set location for parachute deployment is reached, parachutes P are released from compartments in the LAP. At a suitable time or height, inflatable cushions IC carried by the LAP are deployed. The cushions absorb the impact of landing and keep the LAP itself from touching the ground.

The ability to recover the LAP for reuse offers considerable savings in costs per mission, the savings increasing with the number of times that the LAP can be reused. Additional savings are afforded by recovering the LAP near the launch station to provide quick and relatively low cost transport of the LAP to the launch station.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A launch vehicle, comprising:
   an upper stage operable to carry a payload; and
   a booster stage having a body with a longitudinal center axis and an aft portion, the booster stage further comprising a restartable center rocket engine mounted in the aft portion of the body in alignment with the center axis of the body, whereby the center rocket engine restarts after separation to direct the booster stage to a recovery site.

2. The launch vehicle of claim 1, further comprising two or more side rocket engines mounted in the aft portion of the body in symmetrical relation to the center rocket engine.

3. The launch vehicle of claim 1, further comprising means for adjusting the direction of thrust of the center engine so that the vehicle is steerable.

4. The launch vehicle of claim 1, wherein the center engine is a liquid-fueled engine.

5. The launch vehicle of claim 2, wherein the side engines are liquid-fueled engines.

6. The launch vehicle of claim 2, wherein the side engines are mounted such that at lift-off their thrust axes intersect the center of gravity of the launch vehicle.

7. The launch vehicle of claim 2, wherein the center engine and the side engines are liquid-fueled engines and are mounted on a transverse beam.

8. The launch vehicle of claim 7, wherein the body has a cylindrical wall and a thrust ring attached to an aft portion of the wall, and wherein the beam is connected to the thrust ring by a plurality of compression struts oriented obliquely to the center axis.

9. The launch vehicle of claim 8, wherein the compression struts comprise:
   a plurality of side struts connected between portions of the beam proximate to the ends of the beam and the thrust ring; and
   a plurality of center struts connected between a center portion of the beam and the thrust ring.

10. The launch vehicle of claim 1, wherein the center engine has two start cartridges, one for launch and the other for restarting after separation of the booster stage from another stage of the launch vehicle.

11. A booster stage of a launch vehicle, comprising:
    a body having a longitudinal center axis and an aft portion; and a restartable center liquid-fueled rocket engine mounted in the aft portion of the body in alignment with the center axis of the body, the center engine being mounted for selective adjustment of the thrust axis so that the booster stage is steerable, whereby the center rocket engine restarts after separation to direct the booster stage to a recovery site.

12. The booster stage of claim 11, further comprising two or more side liquid-fueled rocket engines mounted in the aft portion of the body in symmetrical relation to the center rocket engine.

13. The booster stage of claim 12, wherein each side engine is oriented such that at lift-off its thrust axis intersects the center of gravity of the launch vehicle.

14. The booster stage of claim 12, wherein the center engine and the side engines are mounted on a transverse beam.

15. The booster stage of claim 14, wherein the body has a cylindrical wall and a thrust ring attached to an aft portion of the wall, and wherein the beam is connected to the thrust ring by a plurality of compression struts oriented obliquely to the center axis.

16. The booster stage of claim 15, wherein the compression struts comprise:
 a plurality of side struts connected between portions of the beam proximate to the ends of the beam and the thrust ring; and
 a plurality of center struts connected between a center portion of the beam and the thrust ring.

17. The booster stage of claim 11, wherein the center engine has two start cartridges, one for launch and the other for restarting after separation of the booster stage from another stage of the launch vehicle.

18. A method of recovering a booster stage of a launch vehicle, comprising:
 launching a launch vehicle from a launch site by starting a center engine of a booster stage;
 shutting down the center engine;
 separating the booster stage;
 restarting the center engine using a start cartridge; and
 directing the booster stage towards a recovery site by controlling the thrust direction of the restarted center engine.

19. The method of claim 18, wherein the booster stage further comprises two or more side liquid-fueled rocket engines mounted in symmetrical relation to the center rocket engine and further comprising:
 starting the side engines at launch; and
 shutting down the side engines to enable booster stage separation.

20. The method of claim 18, wherein the recovery site is a ground recovery site.

21. The method of claim 18, wherein:
 the recovery site is a ground recovery site proximate to the launch site; and
 the step of directing comprises directing the booster stage uprange towards the ground recovery site.

22. The method of claim 18, wherein the booster stage includes deployable parachutes and deployable inflatable landing cushions, and further comprising:
 shutting down the center engine at a predetermined location along the path to the recovery site; and
 deploying the parachutes and the landing cushions so that the booster stage lands at the recovery site in reusable condition.

23. The method of claim 18, wherein the step of launching the launch vehicle by starting the center engine is performed by an additional start cartridge.

* * * * *